United States Patent

[11] 3,616,203

[72] Inventor Albert Brown
  Lincoln, Nebr.
[21] Appl. No. 884,320
[22] Filed Dec. 11, 1969
[23] Division of Ser. No. 647,943, June 22, 1967, abandoned.
[45] Patented Oct. 26, 1971
[73] Assignee Norden Laboratories, Inc.
  Lincoln, Nebr.
  Which is a continuation-in-part of application Ser. No. 416,906, Dec. 8, 1964, now abandoned, which is a continuation-in-part of application Ser. No. 377,098, June 22, 1964, now abandoned.

[54] VIRUS CULTURE AND METHOD
  5 Claims, No Drawings
[52] U.S. Cl. .................................................... 195/1.8,
  195/1.1, 195/1.3, 424/89
[51] Int. Cl. ..................................................... C12k 9/00,
  C12k 5/00
[50] Field of Search ............................................ 424/89;
  195/1.1, 1.3, 1.8

[56] References Cited
UNITED STATES PATENTS
3,432,595  3/1969  Kasza ........................... 424/89

OTHER REFERENCES

Hayflick Experimental Cell Research 25:585–621(1961)
Musser et al. Warren Hillman et al. AM. J. Diseases of Children 103:476–495 Mar. 1962
Science 139:15–20 Jan. 4, 1963
Kasza AM. J. Vet. RFS.25:1178–1185 July 1964
Pakes et al. AM. J. Vet. Res. 26(113):837–843 July 1965
Fowler et al. Cancer Research 26(I):2409–2418 Dec. 1966
"Enduracell" (Norden Labs. Inc. Reg. T.M. 762639 Reg. Jan. 7, 1964 in commerce Apr. 22, 1963

*Primary Examiner*—Shep K. Rose
*Attorneys*—William H. Edgerton, Richard D. Foggio, Joan S. Keps, Alan D. Lourie and Joseph A. Marlino ABSTRACT: Improvement in vaccine preparation whereby an established cell line is tested to determine its suitability for vaccine preparation, the cell line if found to be suitable is frozen to obtain a master cell seed stock, and when desired the master cell seed stock is thawed, tested again for its suitability for use in vaccine preparation, and finally used for that purpose.

3,616,203

VIRUS CULTURE AND METHOD

This application is a division of my copending application Ser. No. 647,943, filed June 22, 1967, now abandoned, which application is a continuation-in-part of may application Ser. No. 416,906, filed Dec. 8, 1964, now abandoned, which in turn is a continuation-in-part of my application Ser. No. 377,098, filed June 22, 1964, now abandoned.

This invention relates to an improvement in vaccine preparation. In particular, the invention relates to an improvement whereby an established cell line, formerly referred to as a stable cell line, is tested to determined its suitability for vaccine preparation. The cell line if found to be suitable is frozen to obtain a master cell seed stock, and when desired, the master cell seed stock is thawed, tested again for its suitability for use in vaccine preparation, and finally used for that purpose. By means of this novel sequence of operations, one can prepare many lots of vaccines having a high degree of safety, potency and uniformity from viruses grown on cells from a common source.

The basic method for the preparation of vaccines dates back as far as 150 years ago. While there have been improvements in virus vaccine production, it has been necessary in order to grow virus in the past to start with so-called normal animals, normal embryonated eggs, or cells in tissue culture taken from a normal animal. When utilizing these cell sources, one trusts that the original source material is truly normal and that virus will grow in it and produce the same amount of antigenic material each time. By testing, one hopes to pick up all possible contaminants.

Cell systems have been classified into three general categories ("Proposed Usage of Animal Tissue Culture Terms" according to Committee on Terminology, Tissue Culture Association, D. S. Fedoroff, Chairman, published in "In Vitro" Vol. II, pg. 155.):

First, there are primary cell cultures started from cells, tissues, or organs taken directly from an animal. A primary culture may be regarded as such until it is subcultured for the first time. They are composed of mixed populations of cells and are expended by use so that fresh tissue must be obtained from new living donors and cultured to maintain a continuous supply of cells. The most serious disadvantage of primary explants as a source of cells is that it is nearly impossible to detect and exclude latent or adventitious viruses and/or other micro-organisms in the cell cultures. Outbreaks of disease have been traced directly to vaccine produced by such cell systems. Also, there is a lack of uniformity between serial lots of vaccines because the cells in each lot originate from different donors.

A cell line arises from a primary cell culture at the time of the first subculture. Usually these cell lines may be subcultured for only a limited number of passages, for instance 20-50 generations. While subculturing greatly increases the probability that latent or contaminating viruses which were harbored in the original tissue will become manifest, this is not a certainty. Also, there is a possibility that a new virus, mycoplasma, or micro-organism will be introduced during subculturing that will remain undetected. In such short term cultures, some cells are often present that develop oncogenic tendencies. Continuing passages may develop mutant cells which will not be as suitable for vaccine production as the same cell line at an earlier passage.

An established cell line is derived from a cell line and is said to have become "established" when it demonstrates the potential to be subcultured indefinitely in vitro. From a practical standpoint this occurs at or above the 70th subculture level when cells can be transferred every three days. The established cell line generally has a uniform appearance and contains only one cell type. The disadvantages of established cell lines are the same as those of a cell line.

In addition to the cultivation of cells from normal tissue, all the classes of cell cultures may also be derived from explants of neoplastic cells. This is undesirable since the cause of the neoplastic transformation is not fully understood. It has never been desirable or safe to use cells derived from neoplasms as a source of substrate for growth of viruses in vaccine production.

It is thus to be noted that each system presents serious disadvantages, particularly for production of vaccine products.

In order to avoid transmission of adventitious viruses, some producers of vaccines prepare their vaccines using cells from a species of animal other than the one for which the vaccine is prepared, in the belief that if the cells should contain adventitious viruses, these viruses might not be pathogenic for the species of animal to be vaccinated with the vaccine. This is perhaps a practical solution in certain instances, but such belief represents poor biological reasoning, because there is much about the pathogenicity of viruses that is not known. For example, until recently most scientists felt safe in saying that cancer, with one or two exceptions, was not infectious, but now it has been found that there is an increasing list of tumor-producing viruses. The problem of adventitious viruses in primary explants has been studied more extensively in monkey kidney tissue culture systems for producing vaccines than in other systems. At least forty different viruses have appeared in cell cultures from the kidneys of apparently healthy monkeys, and several viruses have appeared many times. Certain of these adventitious viruses occur with great frequency, such as the vacuolating agent SV40. Viruses like the SV40 virus have been found to produce tumors in hamsters; also, exclusion of Herpes B virus from monkey cells has been a particular problem.

The above defects in present cell-culturing systems are of vital significance, especially in the preparation of vaccines. Viruses grown on the cell types produced by prior art cell culturing systems do not always produce good vaccines. Growth of virus on unsuitable cells results in variable virus titers and/or altered antigenicity of the vaccines. Also, growth of viruses on abnormal cells and cells already infected with latent viruses results in contaminated vaccines.

The procedure that has customarily been used heretofore for culturing cells in tissue culture may be best described by using as an example the cultivation of dog kidney cells. The starting tissue is obtained from one or more dogs which upon clinical examination appear to be free from disease. The kidneys are processed and cells are cultivated as a monolayer on the glass of a bottle containing a standard culture medium in accordance with well-known and customary procedures. A good culture medium for starting growth of the cells is referred to as Eagles MEM medium supplemented with horse serum and antibiotics. At first, there are several different kinds of cells growing together, such as the fibroblasts from connective tissue and the kidney tubular epithelial cells. The cells may also be contaminated with virus peculiar to the host animal; for example, in the instance of canine cells, the cells may be contaminated with such latent viruses as canine distemper and infectious canine hepatitis. The cells multiply in the bottle until monolayer formation is complete. The cells may be further increased by transferring them to other bottles. This is accomplished by treating them with trypsin to remove them from the glass and dividing them into other bottles with fresh culture medium. For practical purposes, this can only be done once or twice because as they are transferred from one pass to another, growth of most of the cells slows down or stops. When the required number of bottles has been prepared and the cells have stopped growing, it is customary to put maintenance medium on the cells, and for this purpose a mixture such as Earle's salt solution, lactalbumin hydrolysate, a reduced amount of horse serum, and antibiotics is used. The above procedure is conventional practice and it is necessary to start vaccine production before the cells start to degenerate; consequently, it has been necessary to provide fresh cell tissues in making each new serial lot of cells, in which case it can be readily understood that each lot of cells will have slightly different growth characteristics because of the new tissue derivation and processing. Therefore, each lot of cells will not be equally susceptible to virus infection, nor equally good for producing vaccine.

Such cells have only been cultivated for a short time, usually a maximum of 21 days, and may be harboring undesirable and potentially dangerous latent viruses that are undetectable or difficult to detect by tissue culture methods. Potentially dangerous or latent viruses do not necessarily become manifest in 21 days; for example, canine distemper virus can take up to 45 days to express itself initially, so that contaminating viruses can slip through to render the vaccine infectious, injurious, or even fatal.

I have found that the disadvantages encountered in the use of the above-described techniques of vaccine production can be obviated by the use of established cell lines, formerly referred to as stable cell lines, and more particularly, by the application to stable cell lines of a series of techniques, each separately known to the art, but which in their entirety constitute a unique means for ensuring the production of safe, potent and uniform vaccines.

An established cell line is derived by serial subculture of cells from normal tissue growing in tissue culture until it can grow perpetually. It contains only one type of cell and every cell is genetically related. Because of this fact, each individual cell, within the limits of biological variation, has the same biochemical characteristics, the same growth rate, the same virus susceptibility, and, when infected with virus, will respond in the same manner.

My invention consists of utilizing certain testing procedures to determine whether such a stable cell line is safe and otherwise satisfactory for vaccine production; it it is satisfactory, maintaining such a cell line within a limited number of passages; and then using the cells for viral growth and vaccine production. The result of this unique combination of procedures is a means of obtaining safe, potent and uniform vaccines derived from a single uniform cell source.

The procedural steps comprising the present invention consist of freezing an established cell line which has been found to be satisfactory for vaccine production with regard to growth rate, ability to promote viral growth in respect to equality and quantity of virus produced, and stable in morphologic characteristics, free of micro-organisms, free of adventitious and latent viruses, and free of oncogenic properties to obtain a master cell seed stock; removing when desired a portion of the master cell seed stock; subculturing these cells for a number of passages; testing the additionally subcultured cells to determine that they have not changed and are free of oncogenic properties and adventitious and latent viruses; preparing additional cell seed stock from the master cell seed stock; preparing a working cell seed stock from the additional cell seed stock; and using the working cell seed stock for preparing the vaccine.

The particular procedures one can use to determine that the cells are unchanged, i.e., that the cell line is stable, and free of adventitious and latent viruses of oncogenic properties, are not critical to the practice of the present invention. One can utilize any of the conventionally employed techniques. The number of passages through which the cell line is subcultured until it may be considered to be an established cell line is not capable of precise definition, although 65 is considered an approximate minimum. There is no upper limit as long as the cells are able to grow and support the growth of viruses. At any arbitrary passage level the cell line may be suspended in an 8 percent glycerin suspension or other useful suspending fluid such as DMSO, frozen and designated as master cell seed stock awaiting qualification. This master cell seed stock can be frozen at temperatures of $-60°$ to $-180°$ C., $-60°$ C. being preferred, in a liquid nitrogen freezer. It can be stored for periods of at least 4 years and perhaps indefinitely.

When it is desired to use the cells for virus growth and vaccine preparation, a series of tests is conducted to determine if this master cell seed stock awaiting qualification is suitable at this passage level for use, and a series of further subculture passages is made to ensure that at a further passage level it will not have changed and will still be suitable for the desired use. The number of passages through which the cells prepared from the master cell seed stock are grown is not critical, although it must be a sufficient number to preclude the possibility of exceeding this number of passages of any cells used in the production of vaccine. The number of passages might be from 10 to 50, the preferred number being about 25. Since approximately five passages are required in vaccine preparation, it is reasonable to conclude that if oncogenic or other undesirable properties have not developed within 25 passages, no such properties will appear in the course of vaccine preparation.

Determination that the cells are unchanged may be accomplished by methods such as microscopic inspection of stained and unstained preparations and by karyogram analysis. Determination that the cells are free of microbiological contamination and of adventitious and latent viruses is accomplished by such techniques as inoculation of cells and culture medium intracerebrally into suckling mice, parenterally into mice, hamsters and dogs, and inoculation of other cell cultures; standard bacterial tests using both liquid and solid media at two temperatures; and test procedures for detecting PPLO. The cells at the higher passage level are tested to determine if they are free of oncogenic properties. This is accomplished by intracerebral inoculation of X-ray irradiated mice and by cheek pouch inoculation of cortisone-treated hamsters and of neonatal dogs.

When, after subculturing and testing, the master seed stock is found to be free of latent and adventitious viruses and of oncogenic properties, and satisfactory in every other respect, it is suitable for use in vaccine preparation.

One or more vials of the master cell seed stock are thawed and used to prepare cell seed stock which is also frozen. The cell seed stock in turn is used to prepare production seed stock which is also frozen. After purity tests, the production seed stock is used to prepare vaccine. Each lot of vaccine is prepared from the same production cell seed stock until it is all used. A new lot of production cell seed stock is then prepared from the cell seed stock and this pattern is continued. In this way vaccine production may be continued for an extended period of time.

The above-described procedure can be applied to cell lines originating from any animal source including dogs and cattle. The preferred sources are dog kidney and bovine embryo cells, but there is no reason why this procedure could not be applied to any established cell line originating from normal tissue. One such cell line, the DK dog kidney cell line, is epithelial in appearance, of a single-cell type, grows uniformly upon culturing, and supports the growth of canine distemper, infectious canine hepatitis, infectious bovine rhinotracheitis, Herpes simplex, influenza A, influenza B, and rabies viruses.

Since the present invention consists of a sequence of operations performed on stable cell lines in order to verify that the cell line is satisfactory for use in vaccine preparation and then to maintain it indefinitely for use at some future date, the invention is not limited to use in preparing any particular kind of vaccine. Among the vaccines which may be prepared using stable cell lines are canine distemper, infectious canine hepatitis, infectious bovine rhinotracheitis, Herpes simplex, influenza A and B, measles, and rabies.

The following examples are intended to illustrate the practice of the present invention, but are not intended to be construed as limiting the scope thereof.

EXAMPLE 1

The following example illustrates the testing procedure used to determine that the DK established dog cell line was suitable for vaccine production.

Cells at the 120th subculture passage level were designated as master cell seed stock and a supply was frozen away. To accomplish this, cell cultures for the master cell seed stock were grown in Roux bottles containing 100 ml. of Eagle's medium (BME) supplemented with 10 percent normal horse serum and containing 100 units of penicillin and 100 $\mu$g. of dihydrostreptomycin HC1/ml. For maintenance of confluent monolayers of cells a medium consisting of Earle's buffered salt solution supplemented with 0.5 percent lactalbumin hydrolysate and 2 percent normal horse serum was used. To prepare cells for freezing, confluent monolayers of cells were removed from the glass surface by treating them with a mixture of 0.05 percent trypsin and 0.02 percent ethylenediaminetetraacetic acid and magnesium-free saline solution, referred to as AVT solution. Cells removed in this manner were suspended at a concentration of approximately $4 \times 10^7$ cells/ml. in growth medium containing 8 percent glycerol. Ten milliliter amounts of this suspension were distributed into 20 ml. serum bottles and stoppered with a foldover-type stopper. After standing at room temperature for 30 minutes, bottles were placed in a mechanical freezer at −60° C.

As required, bottles were then removed from the freezer for purposes of testing, and for starting new cultures. To start new cultures, frozen cells were thawed rapidly at a temperature of 37°–40 C., diluted to the usual concentration in growth medium, put into Roux bottles, and incubated at 37° C. Following these general procedures the number of subculture passages was extended from 120th passage to the 148th passage.

Testing of cells at all passage levels for bacterial and fungal contamination was conducted according to generally recognized methods for biological products as are published in "Sterility Test Procedure for Veterinary Biological Products," p. 15, of Apr. 5, 1960, of U.S. Department of Agriculture, Division of Veterinary Biologicals, Agricultural Research Service, Washington, D.C. Testing for mycoplasma (PPLO) was conducted according to the procedures recommended in "For the Selection and Use of Human Diploid Cell Strains in the Production of Virus Vaccines," drafted by a subcommittee of the "Symposium on the Characterization and Uses of Human Diploid Cell Strains," Opatija, Yugoslavia, Sept. 24–26, 1963.

Attempts to detect adventitious or latent viruses were made by intracerebral and intraperitoneal inoculation of mice. For intracerebral inoculation tests, mice were inoculated with 0.03 ml., for intraperitoneal inoculation tests, mice were inoculated with 0.5 ml. Dogs were inoculated with cells and culture medium by the intracerebral, intramuscular and subcutaneous routes. For intracerebral inoculation tests, dogs were inoculated with 0.25 ml., for intramuscular and subcultaneous routes, the dose was 1.0 ml. or larger. The cellular components of cells subjected to alternate freezing and thawing to disrupt the cells and release adventitious or latent viruses were inoculated into primary cell cultures of embryonic bovine kidney cells, canine kidney cells, cell lines of bovine kidney and bovine lymph node cells, and the HeLa cell line.

Cells at the subculture levels between the 144th passage and the 154th passage inclusive were used for various tests for tumorigenicity.

Cells at the 144th and 145th passage levels were used to inoculate mice subjected to total body irradiation with X-rays to reduce their resistance to implanted cells. Young C3H/He mice were used. Mice were subjected to 378 rads of X-ray irradiation using 300 kilovolts, 20 milliamps, at a half value layer of 2.0 mm. of copper at a rate of 126 roentgens per minute for 3 minutes. Cell suspensions containing six million viable DK cells per mouse or an equal number of DK cells after lyophilization were inoculated intracerebrally into two groups of 25 mice each. For controls equal numbers of both viable and lyophilized mouse sarcoma cells NCTC 1742 were also inoculated in the same manner. The results in table I conclusively demonstrate that the DK established cell line does not produce tumors, while a mouse tumor cell does.

TABLE I.—RESULTS OF INOCULATION OF C3H MICE INTRACEREBRALLY WITH VIABLE, FROZEN AND THAWED CELLULAR RESIDUE

| | Inoculated | Deaths | Tumors |
| --- | --- | --- | --- |
| Viable DK cells [1] | 24 | 15 | [2]2 |
| Residue DK cells [1] | 29 | 17 | 0 |
| Viable mouse sarcoma cells [1] | 25 | 24 | 20 |
| Residue mouse sarcoma cells [1] | 24 | 12 | 0 |
| Controls | 21 | 11 | 0 |

[1] $6 \times 10^6$ cells.
[2] Doubtful significance: (1) small hemorrhagic area near site of inoculation; (2) a large white mass located in lipoid tissue under left scapula.

Cells at the 154th passage level were implanted into cortisone-conditioned hamsters according to generally recognized procedures. Test hamsters were separated into two groups. In one group the animals were treated with 2.5 mg. of cortisone acetate one a week for 6 weeks. The other group was left untreated. Measured numbers of viable or lyophilized cells were implanted into the cheek pouches. Control animals, similarly treated, were inoculated with a measured number of viable or lyophilized canine transmissible venereal sarcoma cells or of viable primary canine kidney cells. The hamsters were examined at 4 weeks and 7 weeks for evidence of tumors. The results are presented in table II, and conclusively demonstrate that the DK established cell line shows a negligible tendency to multiply.

TABLE II.—CHEEK POUCH GROWTH OF CELLS IN CORTISONE-CONDITIONED AND NORMAL HAMSTERS

| Cell type and state | Animals positive for cell growth for given number of cells inoculated | | | | | |
| --- | --- | --- | --- | --- | --- | --- |
| | $10^8$ | $10^7$ | $10^6$ | $10^5$ | $10^4$ | $10^3$ |
| DK-viable: | | | | | | |
| Cortisonized | [1]1/4 | 1/5 | 0/3 | 0/4 | 0/3 | |
| Normal | 0/3 | [2]2/5 | 0/5 | 0/5 | 0/5 | |
| DK-lyophilized, cortisonized | 0/5 | 0/5 | 0/5 | 0/5 | | |
| TVS-viable: | | | | | | |
| Cortisonized | 5/5 | 4/4 | 3/5 | 3/5 | 2/3 | 0/5 |
| Normal | 5/5 | [3]0/5 | 4/4 | 0/5 | 0/5 | 0/4 |
| TVS-lyophilized, cortisonized | 0/4 | 0/5 | 0/4 | 0/4 | | |
| Primary canine kidney: | | | | | | |
| Cortisonized | [2]2/4 | 0/3 | 0/5 | | | |
| Normal | 0/4 | 0/5 | 0/5 | | | |

[1] Obvious regression from first examination.
[2] Extremely small area. Probably scar tissue associated with trauma of injection.
[3] Lack of growth probably due to improper implantation.
Note.—All data obtained at 7 weeks post inoculation.

Cells at the 145th passage level were used to inoculate neonatal dogs. Two liters of six puppies each at one day of age were used for cell inoculation studies. Three puppies from each litter were inoculated intramuscularly in a hind leg with $10^7$ viable cells suspended in 0.2 ml. of fluid. The other puppies from each litter were inoculated with cellular residues from these cells which had been frozen and thawed twice. The dogs were observed for 4 years and during this time and at necropsy there was no evidence of any tumors in these animals that could be ascribed to the inoculum.

Thus three very sensitive methods were used to detect any oncogenic properties these cells might possess. Since there are not viable cells in products produced from the cell cultures, the evidence from frozen and thawed or lyophilized cells provides additional assurance that subcellular particles will not produce tumors.

Chromosome studies are a further indication of the unchanging character of an established cell line. To investigate this, actively dividing cultures of the DK established cell line at the 123rd to 130th passage level were treated with 0.4 μg. of colchicine/ml., or with 0.05 μg. of "Colcemide"/ml. Colchicine was added to cultures 8 hours postseeding and allowed to remain for 18 hours before harvesting cells. "Colcemide" was added to cultures 24 hours postseeding and allowed to remain for 3 to 4 hours before harvesting cells. Harvested cells were washed in Hank's balanced salt solution, treated with distilled water for 10 minutes, and fixed with methyl alcoholsacetic acid. The fixed cells were air dried on glass slides and stained with Giemsa stain. The results of these chromosome distribution studies are presented in table III.

Table III.—Chromosome Frequency Distribution in 101 DK Cells

| Cells | 1 | 1 | 74 | 5 | 10 | 1 | 9 |
| --- | --- | --- | --- | --- | --- | --- | --- |
| Chromosomes | 70 | 72 | 74 | 75 | 76 | 77 | 78 |

One marker chromosome present appears to be large acrocentric equivalent to No. 1 of the karyotype.

Although the customary number of chromosomes in diploid cells of the dog is 78, the DK cells have lost four chromosomes, but have not developed any new chromosome types or patterns indicative of neoplastic transformation.

Subsequently, and while some of these tests were in progress, cell seed stocks were prepared according to the methods described, tested for purity, and frozen. In turn, production cell seed stocks were prepared from the frozen cell seed stock and after testing for purity were frozen.

All lots of vaccine are thus produced from cells whose relationship can be traced to the cells which have been tested.

EXAMPLE 2

The following examples illustrates the preparation of vaccines using cells treated in accordance with the procedure of example 1:

Cells from the DK dog kidney established cell line are thawed and used to plant one or two tissue culture bottles using Eagle's medium with 10 percent horse serum as growth medium. This bottle is incubated for 3 to 5 days at 35°–37° C. at which time the culture medium is changed to a standard mixture consisting of Earle's salt solution, lactalbumin hydrolysate, antibiotics and 2 percent normal horse serum. The bottles are reincubated for 3 more days. At 6 to 8 days the cells from the bottle are used to plant five bottles.

A trypsin-versene solution is prepared by diluting the stock solution ten times with water. The medium is poured off the tissue culture bottles. The cell sheets are rinsed quickly with about 50 ml. of the trypsin solution, following which about 40–50 ml. of fresh trypsin solution is added. Bottles are laid flat in the incubator until the cells begin to shake loose (about 5–15 minutes). The cells are removed from the bottle and centrifuged at low speed. The supernatant containing the trypsin solution is removed and the cells resuspended evenly in the growth medium. The suspension is then diluted to plant five bottles. After 6 to 8 more days the cells are used to plant 25 bottles and then reused to plant 150 bottles.

The cells used for production are therefore four or five passages removed from the frozen seed cell. Virus for seed cultures and for production are produced in an identical fashion.

At the time the fourth passage is planted as above, 2.0 ml. of Snyder Hill distemper virus seed (adapted to grow on the DK cell line by a series of 24 passages at 10–14 day intervals as described) is added to each cell bottle and then incubated for 3–4 days at 35°–37° C. Trypsin-versene solution is added and the cells shaken loose. The infected cells are divided in triplicate and reincubated using Eagle's medium with 10 percent normal horse serum. After 3 days incubation, the culture medium is changed to Earle's salt solution, lactalbumin hydrolysate, and antibiotics. The cells are reincubated 4–7 days and the vaccine harvested and then lyophilized as desired.

Similarly, infectious canine hepatitis vaccine is prepared using modified strains supplied by Cornell University following 14 passages in porcine kidney tissue.

Infectious bovine rhinotracheitis virus is modified by 10 passages in the DK cell line using techniques described above, followed by one additional passage in primary bovine embryonic kidney cells. The DK cells are then inoculated as described, the vaccine harvested 3 days later, and then stored in a freezer.

I claim:

1. In a method of preparing a canine virus culture for vaccine preparation on canine cells capable of supporting growth thereon, the improvement consisting of the steps of:
   1. freezing an established dog kidney cell line typically characterized by having about 74 chromosomes, although the customary number of chromosomes in diploid cells of the dog is 78, and having not developed any new chromosome types or patterns indicative of neoplastic transformation and which, after a minimum of 65 passages, has been determined to be satisfactory with regard to growth rate, ability to promote viral growth in respect to quality and quantity of virus produced, stable in morphologic characteristics, free of micro-organisms free of adventitious, latent, and noncytopathogenic canine-infective viruses and free of oncogenic properties, to obtain a master cell seed stock;
   2. subculturing said cells for a number of passages sufficient to preclude the possibility of exceeding this number of passages in canine virus vaccine production;
   3. testing the additionally subcultured cells to determine that they have not changed morphologically, that the chromosome count, type, and distribution have remained essentially constant and chromosomally unchanged in not having developed any new canine cell chromosome types or patterns indicative of canine neoplastic transformation, and that they are free of oncogenic properties and latent canine-infective viruses;
   4. preparing additional cell seed stock from said master cell seed stock;
   5. preparing working cell seed stock from the cell seed stock; and
   6. preparing the canine virus cell culture by propagating in the working cell seed stock a canine-infective virus capable of growing thereon.

2. A method as claimed in claim 1, where the canine virus is canine distemper virus.

3. A method as claimed in claim 1, where the canine virus is infectious canine hepatitis virus.

4. A canine distemper virus culture for vaccine preparation when prepared by the process of claim 2.

5. An infectious canine hepatitis virus culture for vaccine preparation when prepared by the process of claim 3.

* * * * *